United States Patent
Zawacki et al.

(10) Patent No.: US 8,539,114 B2
(45) Date of Patent: Sep. 17, 2013

(54) STATE SHARING BETWEEN BASE AND DETACHABLE DEVICE

(75) Inventors: Jennifer Greenwood Zawacki, Hillsborough, NC (US); Mark Charles Davis, Durham, NC (US); Scott Edwards Kelso, Cary, NC (US); Bin Li, Beijing (CN); Steven Richard Perrin, Raleigh, NC (US); Matthew Roper, Cary, NC (US); Sheng Wang, Beijing (CN); Yi Zhou, Raleigh, NC (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 12 days.

(21) Appl. No.: 12/985,195

(22) Filed: Jan. 5, 2011

(65) Prior Publication Data

US 2012/0173764 A1    Jul. 5, 2012

(51) Int. Cl.
*G06F 3/00* (2006.01)
*G06F 13/00* (2006.01)
*G06F 3/033* (2013.01)
*G09G 3/36* (2006.01)
*G09G 5/08* (2006.01)

(52) U.S. Cl.
USPC ............ 710/8; 710/10; 710/13; 710/100; 710/240; 345/104; 345/163; 345/679

(58) Field of Classification Search
USPC ............ 710/8, 10, 13, 100, 243; 345/104, 345/163, 679
See application file for complete search history.

(56) References Cited

U.S. PATENT DOCUMENTS

| | | | | |
|---|---|---|---|---|
| 5,935,244 | A * | 8/1999 | Swamy et al. | 726/9 |
| 6,519,627 | B1 * | 2/2003 | Dan et al. | 709/203 |
| 2003/0198008 | A1 * | 10/2003 | Leapman et al. | 361/681 |
| 2004/0164962 | A1 * | 8/2004 | Yin | 345/163 |
| 2006/0030956 | A1 * | 2/2006 | Kumar | 700/66 |
| 2006/0098401 | A1 * | 5/2006 | Shin | 361/683 |
| 2006/0104017 | A1 * | 5/2006 | Chang et al. | 361/683 |
| 2006/0106823 | A1 * | 5/2006 | Clark et al. | 707/100 |
| 2009/0150569 | A1 * | 6/2009 | Kumar et al. | 709/248 |
| 2009/0262084 | A1 * | 10/2009 | Yu | 345/173 |
| 2009/0279722 | A1 * | 11/2009 | Lin | 381/311 |
| 2010/0067186 | A1 * | 3/2010 | Aya et al. | 361/679.28 |
| 2010/0262725 | A1 * | 10/2010 | Ikeda et al. | 710/15 |
| 2010/0272030 | A1 | 10/2010 | Babbar | |
| 2011/0276885 | A1 * | 11/2011 | Gibson et al. | 715/734 |

OTHER PUBLICATIONS

Lars Schwichtenberg: Zwei auf einen Stretch—Lenovo IdeaPad U1 hybrid (Notebook), CHIP Online, Jan. 13, 2010, URL: http://www.chip.de/artikei/Lenovo-IdeaPad-U1-hybrid-Notebook-Praxis-Test_40728168.html [abgerufen am Mar. 27, 2012].
Wikipedia zu Synchronisation, Version vom Nov. 15, 2010, URL: http://de.wikipedia.org/w/index.php?title=Synchronisation&oldid=81550237 [abgerufen am Mar. 29, 2012].
DE10 2011 055 276.6 Examination Report, Mar. 29, 2012.

* cited by examiner

*Primary Examiner* — Idriss N Alrobaye
*Assistant Examiner* — Getente A Yimer
(74) *Attorney, Agent, or Firm* — Kunzler Law Group (57) ABSTRACT

An apparatus and method are disclosed for state sharing. A change module detects a change of a configuration state for at least one of a base and a detachable device. A connection module detects a connection between the base and the detachable device. The detachable device provides a display and a network connection for the base if the base and detachable device are connected. A synchronize module synchronizes the configuration state of the detachable device with the configuration state of the base in response to detecting the connection and detecting the change of configuration state.

17 Claims, 6 Drawing Sheets

STATE SHARING BETWEEN BASE AND DETACHABLE DEVICE

BACKGROUND

1. Field

The subject matter disclosed herein relates to state sharing and more particularly relates to state sharing between a base and a detachable device.

2. Description of the Related Art

A computer system may incorporate a detachable device to allow a user to have access to limited computing functionality through the detachable device in a smaller, lighter, more transportable form factor. The detachable device may connect to a base of the computer system. Both the base and the detachable device may each include a processor, memory, and communications hardware.

When disconnected from the base, the detachable device may independently provide sufficient functionality to allow the user to access email and messaging accounts, view media content, access schedules, take notes, and perform other tasks.

When connected to the base, the user may use the detachable device along with a more extensive resource set available through the base such as a hard disk drive, an optical drive, a keyboard, Input/Output (I/O) ports, and the like.

While the base and the detachable device are disconnected, the user may modify a configuration state of the base and/or the detachable device. The user may further wish that the modified configuration state be available in a seamless computing system environment after the base and the detachable device are reconnected.

BRIEF SUMMARY

Based on the foregoing discussion, the inventors have recognized a need for an apparatus and method that shares a configuration state. Beneficially, such an apparatus and method would synchronize the configuration states between a base and a detachable device.

The embodiments of the present invention have been developed in response to the present state of the art, and in particular, in response to the problems and needs in the art that have not yet been fully solved by currently available state sharing methods. Accordingly, the embodiments have been developed to provide an apparatus and method for state sharing that overcome many or all of the above-discussed shortcomings in the art.

The apparatus for state sharing is provided with a plurality of modules configured to functionally execute the necessary steps of detecting a change of a configuration state, detecting a connection, and synchronizing the configuration state. These modules in the described embodiments include a change module, a connection module, and a synchronize module.

The change module detects a change of a configuration state for at least one of a base and a detachable device. The connection module detects a connection between the base and the detachable device. The detachable device provides a display and a network connection for the base if the base and detachable device are connected. The synchronize module synchronizes the configuration state of the detachable device with the configuration state of the base in response to detecting the connection and detecting the change of configuration state.

A method is also presented for state sharing. The method in the disclosed embodiments substantially includes the steps necessary to carry out the functions presented above with respect to the operation of the described apparatus. In one embodiment, the method includes detecting a change of a configuration state, detecting a connection, and synchronizing the configuration state.

A change module detects a change of a configuration state for at least one of a base and a detachable device. A connection module detects a connection between the base and the detachable device. The detachable device provides a display and a network connection for the base if the base and detachable device are connected. A synchronize module synchronizes the configuration state of the detachable device with the configuration state of the base in response to detecting the connection and detecting the change of configuration state.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, Radio Frequency (RF), etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
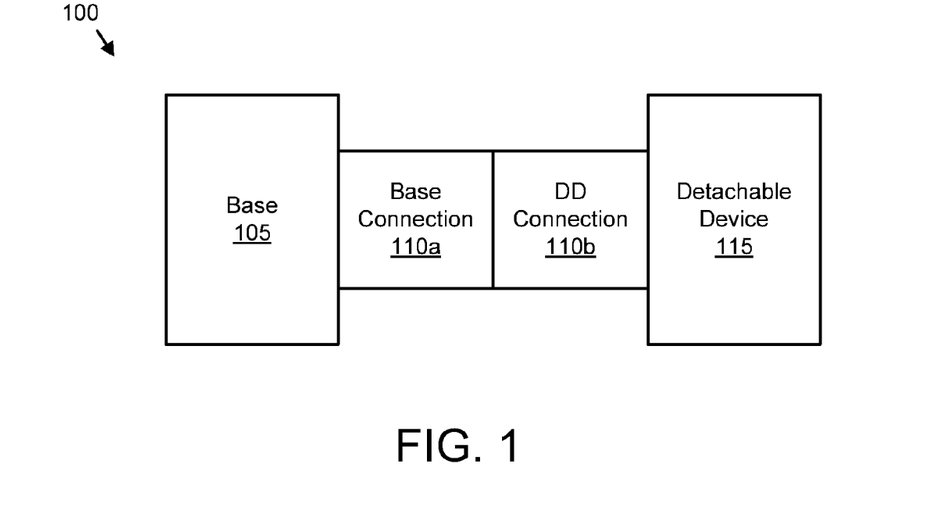
FIG. 1 is a schematic block diagram illustrating one embodiment of a computing system.

FIG. 1 is a schematic block diagram illustrating one embodiment of a computer system 100. The computer system 100 includes a base 105 and a detachable device 115. The base 105 connects to the detachable device 115 through connection 110 comprising a base connection 110*a* and a detachable device connection 110*b*. In one embodiment, the base connection 110*a* and the detachable device connection 110*b* are Universal Serial Bus (USB) connections. Alternatively, the base connection 110*a* and the detachable device connection 110*b* may be Institute of Electrical and Electronic Engineers (IEEE) 1394 interface (1394) connections, High-Definition, Multimedia Interface (HDMI) connections, custom serial bus connections, custom parallel bus connections, or the like.

In one embodiment, the detachable device 115 provides a display for the base 105 if the detachable device 115 and the base 105 are connected. In addition, the detachable device 115 may provide other functionality for the base 105. In a certain embodiment, the detachable device 115 provides a network connection.

The base 105 may provide additional resources for use with the detachable device. For example, the base 105 may include a mass storage device such as a hard disk drive, a micromechanical storage device, and optical storage device, a holographic storage device, and the like.

The base 105 may also provide additional input devices such as a keyboard, a mouse, a joystick, a game controller, and the like. In one embodiment, the base 105 includes additional I/O ports such as USB ports, 1394 ports, HDMI ports, external power supply ports, and the like.

In one embodiment, both the base 105 and the detachable device 115 include power sources such as batteries, fuel cells, and the like. In one embodiment, a power source of the base 105 may provide power to the detachable device 115 from a base power source when the base 105 and the detachable device 115 are connected. The detachable device 115 may use a device power source for power when disconnected from the base 105.

The base 105 may monitor the connection 110 between the base 105 and the detachable device 115. In addition, the detachable device 115 may also monitor the connection 110 between the base 105 and the detachable device 115. Thus the detachable device 115 is aware of a connection event such as the detachable device 115 disconnecting from the base 105 and the detachable device 115 connecting to the base 105. The base 105 is also aware of each connection event.

In one embodiment, the base 105 may execute one or more tasks. The base 105 may use a display of the detachable device 115 to interact with a user in performing the tasks. For example, the base 105 may execute a browser displaying a Universal Resource Locator (URL). The detachable device 115 may maintain a device task list of the tasks executed by the base 105. For example, the device task list may include the URL displayed by the browser.

If the detachable device 115 is disconnected from the base 205, the detachable device 115 may execute one or more tasks from the device task list. For example, the detachable device 115 may deploy the browser and display the URL from the device task list. In one embodiment, the detachable device 115 may display the device task list and the user may select which tasks are executed.

In a certain embodiment, the user may eject the detachable device 115 before disconnecting the detachable device 115 from the base 105. As used herein, eject refers to directing an operating system to close logical connections between the base 105 and the detachable device 115. If the user ejects the detachable device 115, the base 105 may update the device task list of the detachable device 115 with all executing tasks before completing the ejection of the detachable device 115. Alternatively, the detachable device 115 may receive an update of each base task to maintain a current device task list.

The base 105 and the detachable device 115 may each include a configuration state. Each configuration state may specify functionality and/or user interaction settings. For example, each state configuration may comprise a disable wireless setting, a display brightness setting, an audio setting, and a touch sensitivity setting. The user may modify a configuration state of the base 105 and/or the detachable device 115 while the base 105 and the detachable device 115 are disconnected. The user may further wish that the modified configuration state be applied to both the base 105 and the detachable device 115 after the base 105 and the detachable device 115 are reconnected to provide a seamless environment to the user. The embodiments described herein share configuration states between the base 105 and the detachable device 115 as will be described hereafter.

Figure 2:
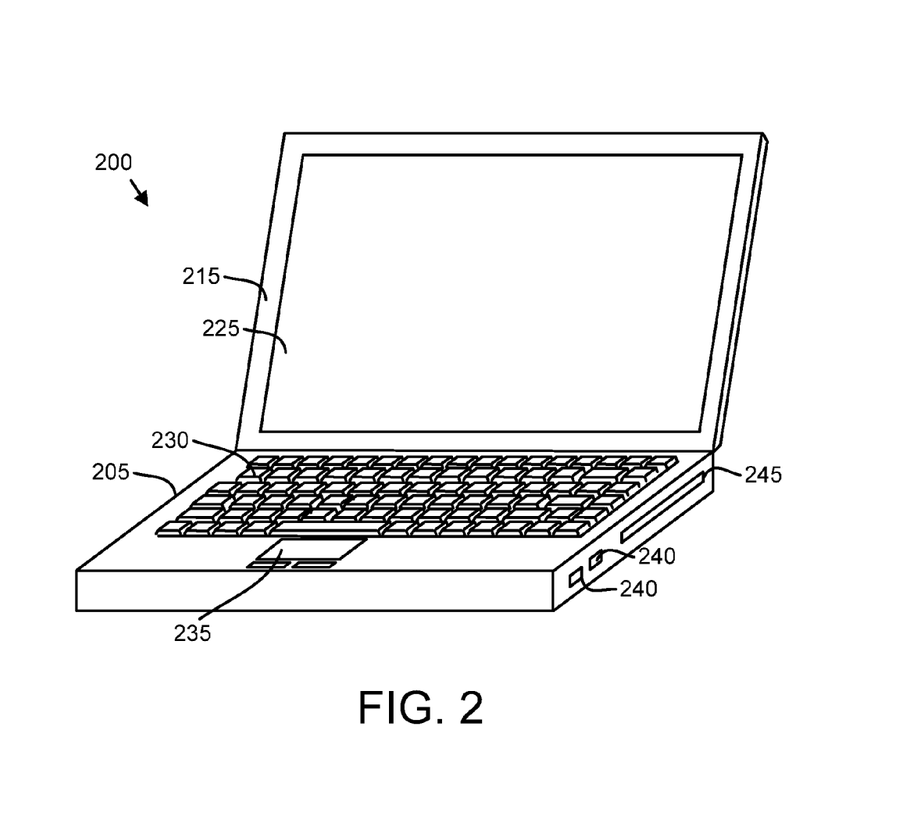
FIG. 2 is a perspective drawing illustrating one embodiment of a computing system

FIG. 2 is a perspective drawing illustrating one embodiment of a computer system 200. The computer system 200 illustrates one embodiment of the computer system 100 of FIG. 1. In one embodiment, the computer system 200 is U1 hybrid notebook produced by Lenovo. The description of the computer system 200 refers to elements of FIG. 1, like numbers referring to like elements.

The computer system 200 includes a base 205 and a detachable device 215. The base 205 may be the base 105 of FIG. 1. In addition, the detachable device 215 may be the detachable device 115 of FIG. 1. The detachable device 215 is shown connected to the base 205. In the depicted embodiment, the base 205 includes a keyboard 230, a touchpad 235, I/O connections 240, and an optical drive 245. The I/O connections 240 may be USB connections, 1394 connections, HDMI connections, or the like.

When the detachable device 215 is connected to the base 205, the detachable device 215 may provide a display 225 for the base 205. In one embodiment, both the base 205 and the detachable device 215 include power sources such as batteries, fuel cells, and the like. In one embodiment, a power source of the base 205 may provide power to the detachable device 215 when the base 205 and the detachable device 215 are connected. Alternatively, both the power source of the base 205 and the power source of the detachable device 215 may be used concurrently.

Figure 3:
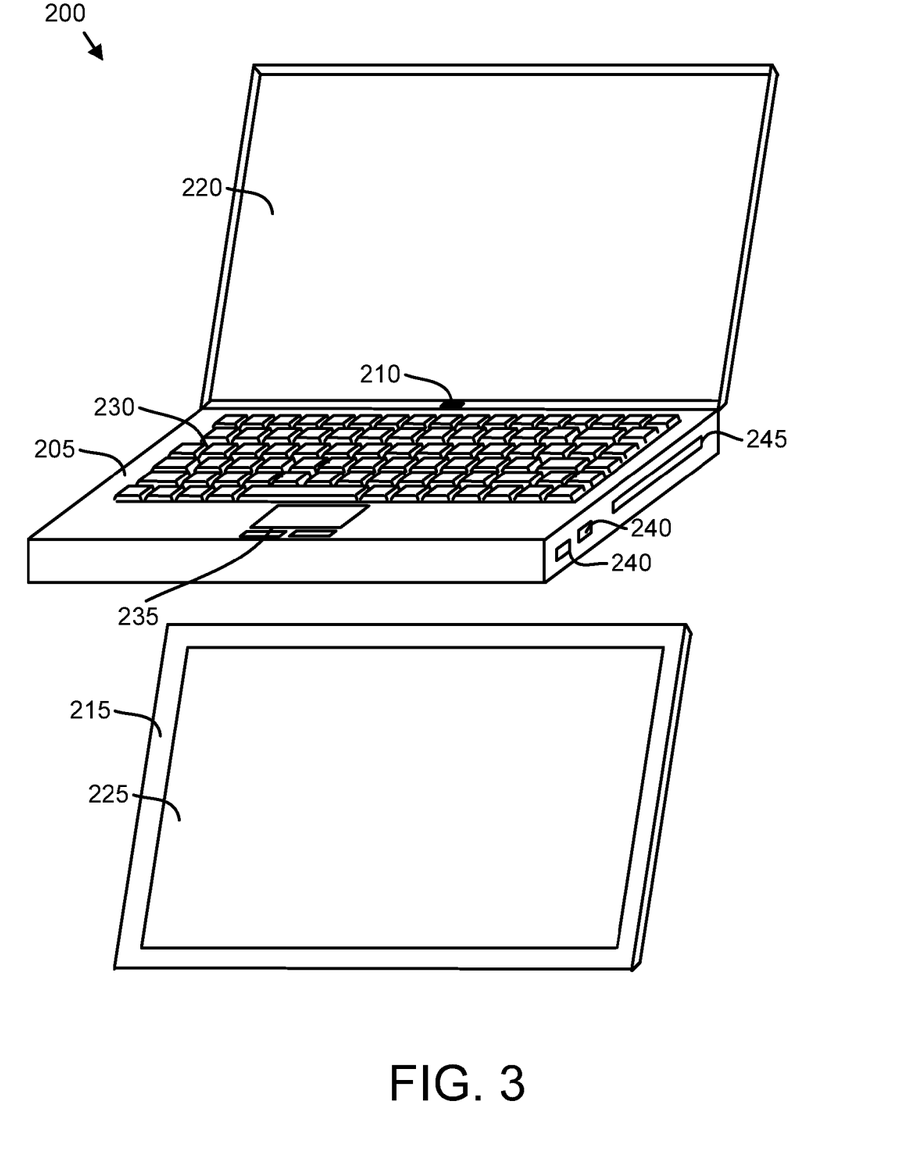
FIG. 3 is a perspective drawing illustrating one embodiment of a computing system.

FIG. 3 is a perspective drawing illustrating one embodiment of a computer system 200. The computer system 200 of FIG. 2 is shown with the detachable device 215 disconnected from the base 205. In one embodiment, the detachable device 215 connects to the base 205 through a connector 210. The description of the computer system 200 refers to elements of FIGS. 1-2, like numbers referring to like elements.

The connector 210 may be a USB connection. In an alternate embodiment, the connector 210 employs USB compliant signals through a custom connector. In addition, the connector may be a 1394 connector, a HDMI connector, and the like. In a certain embodiment, the connector 210 employs a custom interface. When the detachable device 215 is connected to the base 205, a support 220 may support the physical connection between the base 205 and a detachable device 215.

Figure 4:
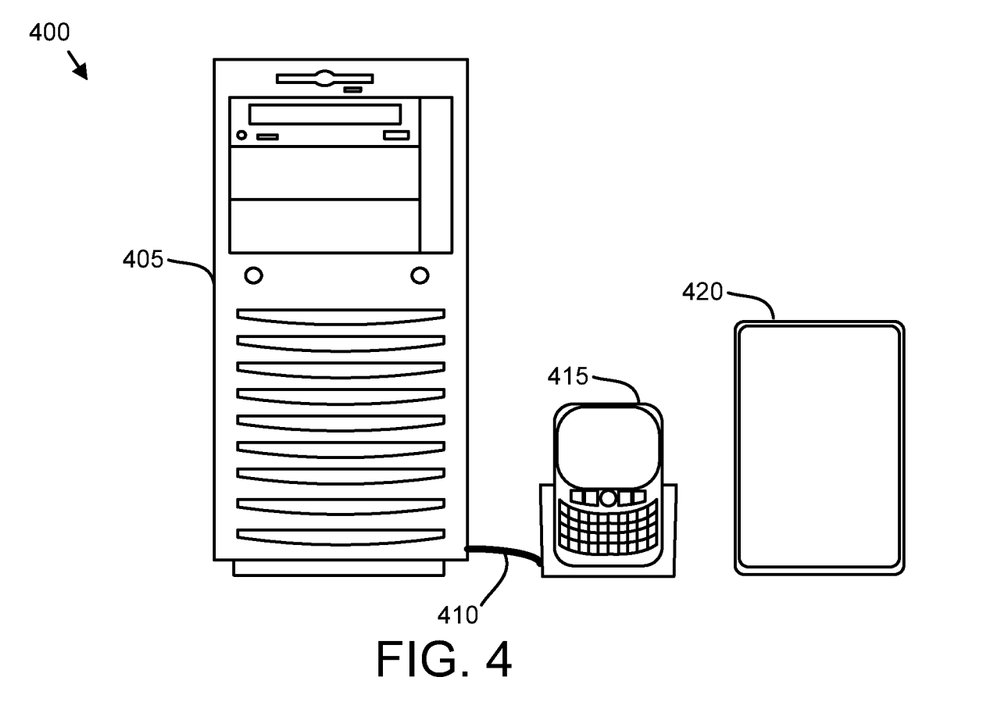
FIG. 4 is a front view drawing illustrating one alternate embodiment of a computing system.

FIG. 4 is a front view drawing illustrating one alternate embodiment of a computer system 400. The computer system 400 illustrates one embodiment of the computer system 100 of FIG. 1. The description of the computer system 400 refers to elements of FIGS. 1-3, like numbers referring to like elements.

The base 105 is depicted as a computer tower 405. The detachable device 115 is depicted as a cellular telephone 415. The connection 110 is depicted as a cable 410 such as a USB cable. One of skill in the art will recognize that the embodiments may be practiced with other combinations of devices. The detachable device 415 may provide a display and/or a network connection for the base 405. The base 105 may also be in communication with a third device 420.

In one embodiment, the base 105 communicates with a third device 420. The third device 420 may be detachable device 215. The base 105 may communicate with the third device 420 through a wireless network.

Figure 5:
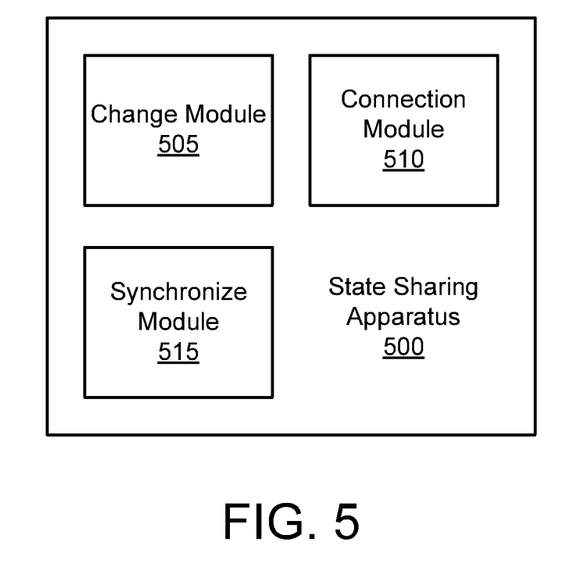
FIG. 5 is a schematic block diagram illustrating one embodiment of a state sharing apparatus.

FIG. 5 is a schematic block diagram illustrating one embodiment of a state sharing apparatus 500. The apparatus 500 may be embodied in the base 105 and the detachable device 115 of FIG. 1. The description of the apparatus 500 refers to elements of FIGS. 1-4, like numbers referring to like elements. The apparatus 500 includes a change module 505, a connection module 510, and a synchronize module 515. The change module 505, connection module 510, and synchronize module 515 may comprise a computer readable storage medium storing computer readable program code executed by a processor and/or a hardware circuit The change module 505 detects a change of a configuration state for at least one of the base 105 and the detachable device 115. In one embodiment, the configuration state of the base 105 is stored in first data store residing on the base 105. In addition, the configuration state of the detachable device 115 may be stored in a second data store residing on the detachable device 115. The change module 505 may detect the change of the configuration state by detecting a write to the data store storing the configuration state.

The connection module 510 detects a connection between the base 105 and the detachable device 115. In one embodiment, the connection module 510 receives a notification from an operating system of the connection. Alternatively, the connection module 510 may periodically poll the base connection 110a and the detachable device connection 110b to detect the connection.

The synchronize module 515 synchronizes the configuration state of the detachable device 115 with the configuration state of the base 105 in response to detecting the connection and detecting the change of configuration state. In one embodiment, the synchronize module 515 copies a changed value of one configuration state to the other configuration state as will be described hereafter.

Figure 6:
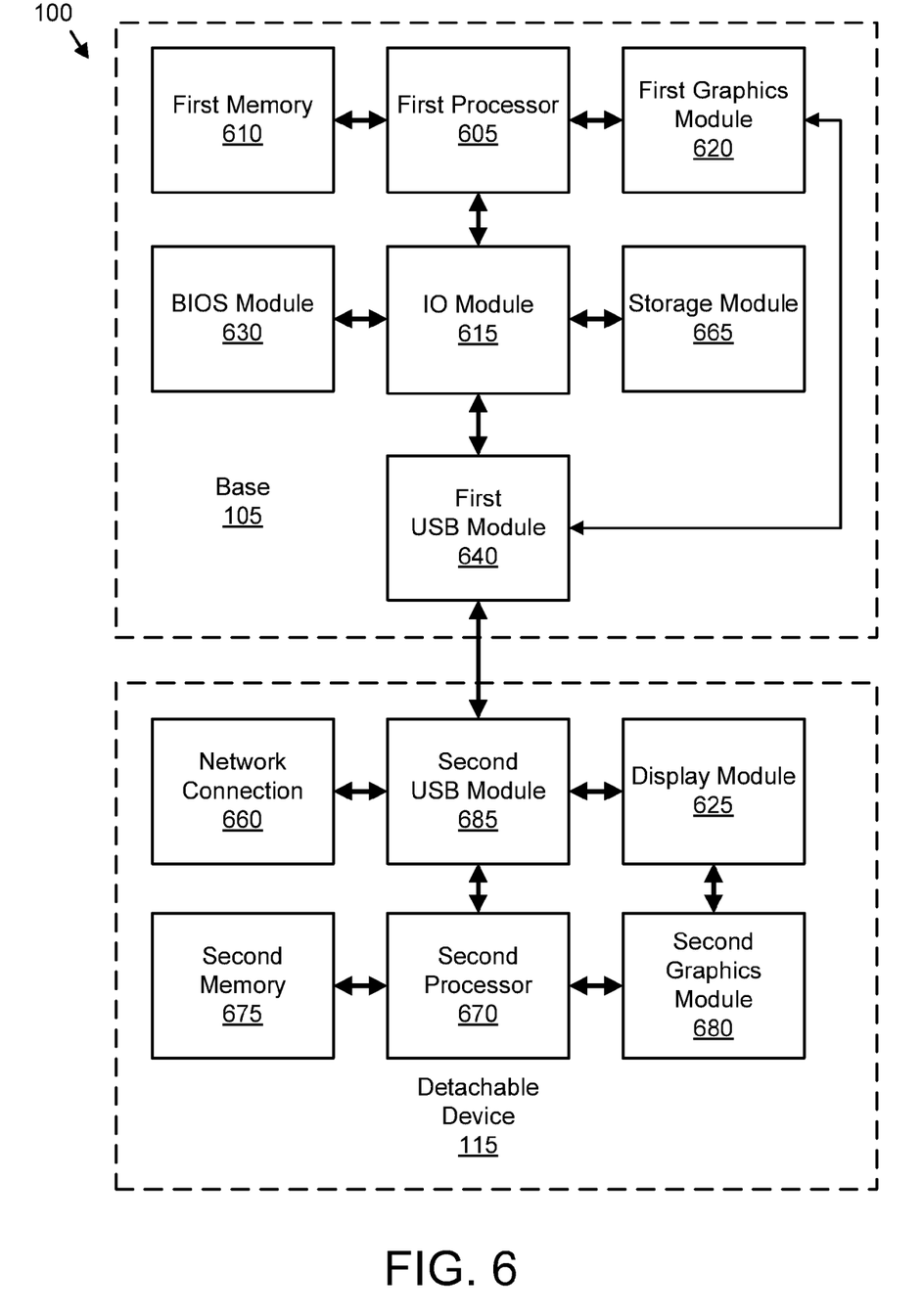
FIG. 6 is a schematic block diagram illustrating one embodiment of a base and a detachable device.

FIG. 6 is a schematic block diagram illustrating one embodiment of a base 105 and detachable device 115 of the computing system 100. The description of the base 105 and the detachable device 115 refers to elements of FIGS. 1-5, like numbers referring to like elements. The base 105 includes a first processor 605, a first memory 610, a first IO module 615, a first graphics module 620, a basic input/output system (BIOS) module 630, a first USB module 640, and a storage module 655. The detachable device 115 includes a second processor 670, a second memory 675, a second graphics module 680, a display module 625, a network connection 660, and a second USB module 685. One of skill in the art will recognize that other configurations of the computer system 100 may be employed with the embodiments described herein.

The first processor 605, first memory 610, first IO module 615, first graphics module 620, BIOS module 630, first USB module 640, second processor 670, second memory 675, second graphics module 680, display module 625, network connection 660, and second USB module 685, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The first USB module 640 may be the base connection 110a of FIG. 1. The second USB module 685 may be the detachable device connection 110b of FIG. 1. The base 105 and detachable device 115 may communicate through the first and second USB modules 640, 685.

The first memory 610 stores computer readable programs. The first memory 610 may include Dynamic Random Access Memory (DRAM), Flash memory, or the like. The first processor 605 executes the computer readable programs as is well known to those skilled in the art. The computer readable programs may be tangibly stored in the storage module 655. The storage module 655 may comprise at least one Solid State Device (SSD). In addition, the storage module 655 may include a hard disk drive, an optical storage device, a holographic storage device, a micromechanical storage device, or the like.

The first processor 605 may include an integrated cache to reduce the average time to access the first memory 610. The integrated cache may store copies of instructions and data from the most frequently used first memory 610 locations. The first processor 605 may communicate with the first memory 610 and the first graphics module 620. In one embodiment, the first processor 605 issues display commands and display data to the first graphics module 620 and the first graphics module 620 may generate rendering data for the display module 625.

In addition, the first processor 605 may communicate with the IO module 615. The IO module 625 may support and communicate with the BIOS module 630, a Peripheral Component Interconnect (PCI) bus, a Wi-Fi interface, and the like.

The BIOS module 630 may communicate instructions through the IO module 615 to boot the base 105, so that the computer readable program stored on the storage module 655 can load, execute, and assume control of the base 105. Alternatively, the BIOS module 630 may comprise a coded program embedded on a chipset that recognizes and controls various devices that make up the base 105.

The display module 625 may include the display 225 as well as additional hardware to for example decode touch inputs. When the detachable device 115 is connected to the base 105, the first graphics module 620 may communicate with the display module 625 through the first and second USB modules 640, 685. Thus the first graphics module 620 may drive the display 225 and receive inputs from the display 225.

The second memory 675 stores computer readable programs. The second memory 675 may comprise non-volatile memory devices such as Flash memory. The second processor 670 executes the computer readable programs. In one embodiment, the second processor 670 issues display commands and display data to the second graphics module 680 and the second graphics module 680 may generate rendering data for the display module 625.

In one embodiment, the detachable device 115 includes a network connection 660. The network connection 660 may communicate with a network. In one embodiment, the network is a Network Driver Interface Specification (NDIS) compliant network. In a certain embodiment, the network is a Remote NDIS (RNDIS) network. In an alternate embodiment the network is a Wireless WAN. The base 105 may communicate with the network through the network connection 660 via the first and second USB modules 640, 685.

In one embodiment, an instruction set of the first processor 605 is incompatible with an instruction set of the second processor 670. The first processor 605 may be based on an X86 instruction set and the second processor 670 may be based on an ARM instruction set.

In one embodiment, the first processor 605 and the second processor 670 may each execute a separate operating system. The first processor 605 may execute a first operating system. The first operating system may be a personal computer operating system such as a MICROSOFT WINDOWS® compatible operating system, an APPLE MACINTOSH® compatible operating system, a Linux compatible operating system, or the like. The second processor 670 may execute a second operating system. The second operating system may be a cellular telephone operating system such as an operating system based on the ANDROID® Platform Architecture, a MICROSOFT WINDOWS® compatible mobile operating system, or the like.

Figure 7:
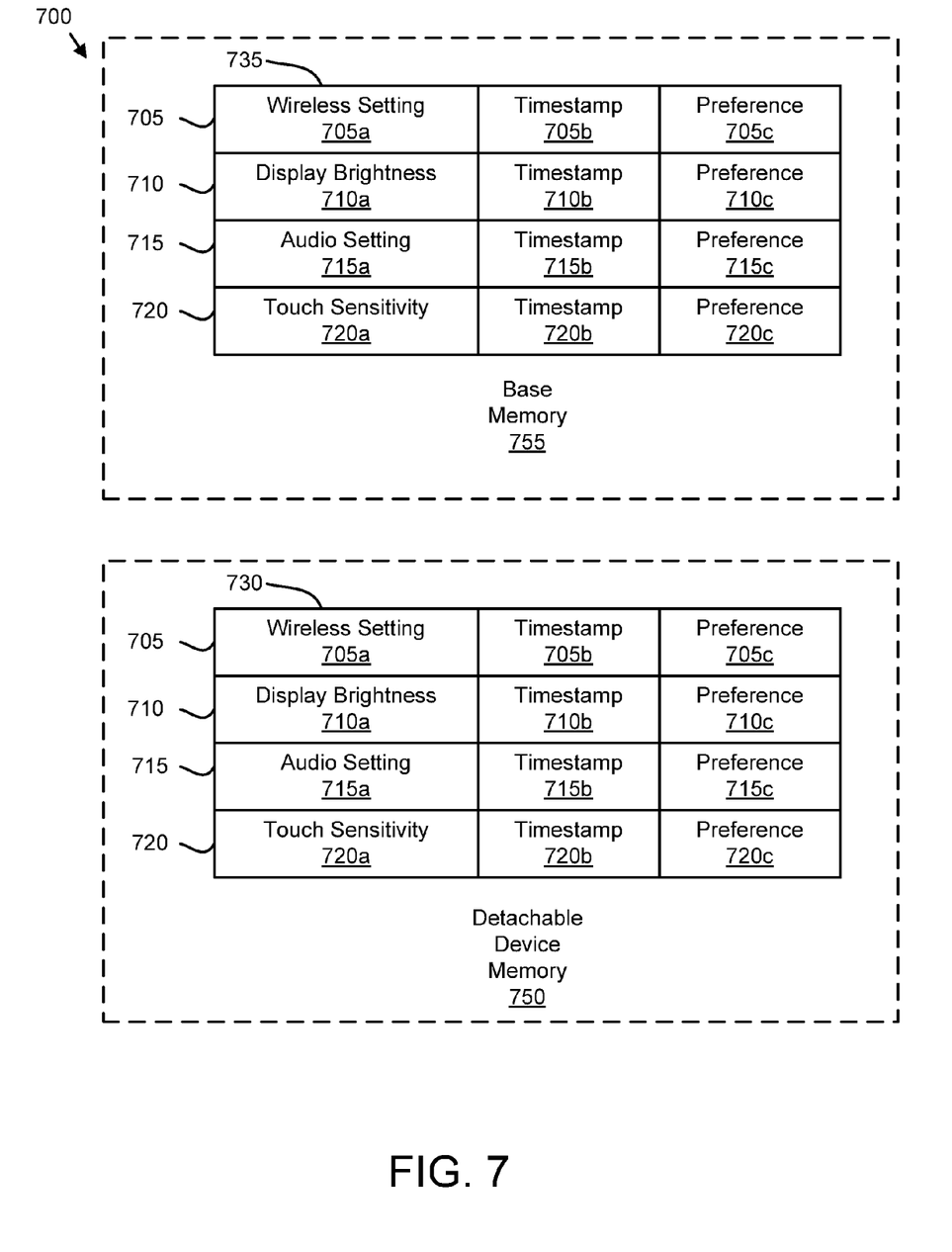
FIG. 7 is a schematic block diagram illustrating one embodiment of configuration states.

FIG. 7 is a schematic block diagram illustrating one embodiment of configuration states 700. The configuration states 700 include a base configuration state 735 stored in data store of a base memory 755 and a detachable device configuration state 730 stored in data store of a detachable device memory 750. The description of the configuration states 700 refers to elements of FIGS. 1-6, like numbers referring to like elements.

The base memory 755 may be the first memory 610 and the detachable device memory 750 may be the second memory 675. In one embodiment the base memory 755 and/or the detachable device memory 750 may be a non-volatile memory. In a certain embodiment, the base memory 755 stores a first data store comprising the base configuration state 735. The base configuration state 735 may be organized as an array of values, a linked list of data structures, a flat file, or the like. The detachable device memory 755 may store a second data store comprising the detachable device configuration state 730. The detachable device configurations state 735 may be organized as an array of values, a linked list of data structures, a flat file, or the like. In one embodiment, the third device 420 stores a configuration state equivalent to the detachable device configuration state 730.

In one embodiment, the base configuration state 735 and the detachable device configuration state 730 includes values for a disable wireless setting 705, a display brightness setting 710, an audio setting 715, and a touch sensitivity setting 720. The disable wireless setting 705 may disable radio transmitters and/or receivers. For example, the disable wireless setting 705 may be asserted when wireless communication is restricted, such as during an airline flight.

The display brightness setting 710 may specify a brightness of the display 225. The audio setting 715 may specify the baseline volume of one or more audio output devices. For example, the audio setting 715 may specify that a speaker is muted. The touch sensitivity setting 720 may specify a force threshold required to detect a touch to a touch screen display, the touch pad 235, or the like.

In one embodiment, each setting such as the disable wireless setting 705, display brightness setting 710, audio setting 715, and touch sensitivity setting 720 includes a timestamp 705b, 710b, 715b, 720b and a preference 705c, 710c, 715c, 720c. The timestamps 705b, 710b, 715b, 720b may record a date and time when a setting is changed.

The preferences 705c, 710c, 715c, 720c may indicate that a setting of one device such as the detachable device 115 is preferred over a setting of the other device regardless of which setting was most recently modified. For example, the preferences 705c, 710c, 715c, 720c may indicate that a detachable device configuration state setting is preferred over a base configuration setting. In one example, the audio setting preference 715c may indicate that the audio setting 715 of the detachable device configuration state 730 is to be used in preference to the audio setting 715 of the base configuration state 735, even if the audio setting 715 of the base configuration state 735 is more recently modified.

Figure 8:
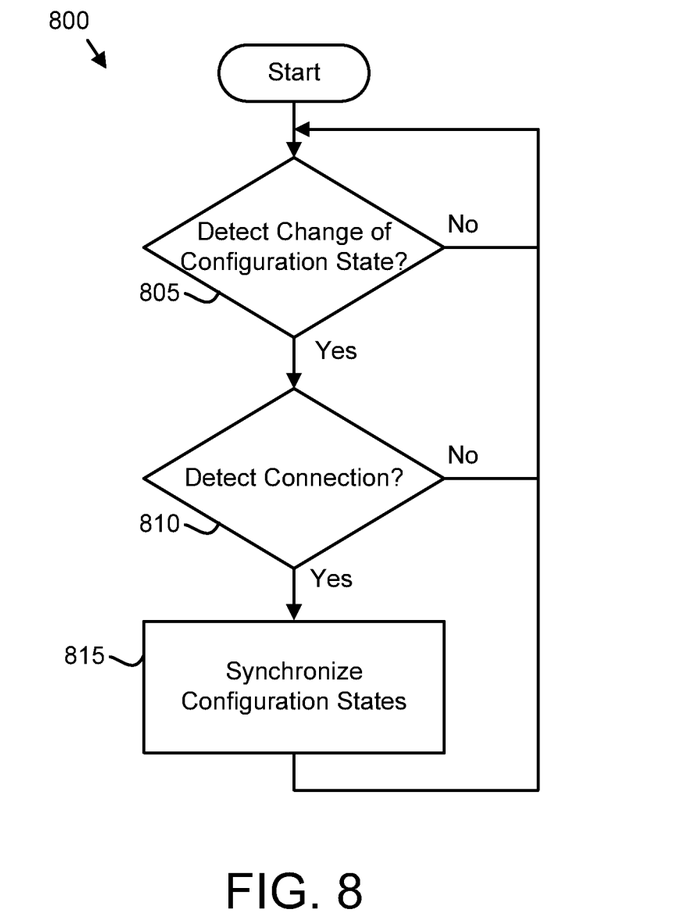
FIG. 8 is a schematic flow chart diagram illustrating one embodiment of a state sharing method.

FIG. 8 is a schematic flow chart diagram illustrating one embodiment of a state sharing method. The method may implement the state sharing functions of the apparatus 500 of FIG. 5. The description of the method 800 refers to elements of FIGS. 1-7, like numbers referring to like elements.

The method 800 begins, and in one embodiment, the change module 505 detects 805 a change of a configuration state for at least one of the base 105 and the detachable device 115. The change module 505 may detect 805 the change of the configuration state by detecting a write to the data store storing the configuration state. Alternatively, the change module 505 may compare the time stamps 705b, 710b, 715b, 720b for each setting of the base configuration state 735 with the time stamps 705b, 710b, 715b, 720b of each setting of the detachable device configuration state 730. If the change module 505 does not detect 805 the change of configuration states, the change module 505 may continue to monitor to detect 805 a change of configuration states.

If the change module 505 detects 805 the change of a configuration state, the connection module 510 detects 810 a connection between the base 105 and the detachable device 115. In one embodiment, the connection module 510 receives a notification from an operating system of the connection. In addition, the connection module 510 may store a connection state value. Alternatively, the connection module 510 may periodically poll the base connection 110a and the detachable device connection 110b to detect the connection. If the change module 505 does not detect 805 the change of configuration states, the change module 505 may continue to monitor to detect 805 a change of configuration states.

If the connection module 510 does detect 810 the connection, the synchronize module 515 synchronizes 815 the configuration state 730 of the detachable device 115 with the configuration state 735 of the base 105. In a certain embodiment, the synchronize module 515 synchronizes 815 the configuration states of the detachable device 115, the base 105, and the third device 420.

In one embodiment, the synchronize module 515 overwrites a least recently modified value for a first setting of one configuration state with a more recently modified value for the first setting of the other configuration state. For example, if the disable wireless setting 705 of the detachable device configuration state 730 is more recently modified than the disable wireless setting 705 of the base configuration state 735, the synchronize module 515 may overwrite the value of the disable wireless setting 705 of the base configuration state 735 with the value of the disable wireless setting 705 of the detachable device configuration state 730.

In one embodiment, the synchronize module 515 synchronizes 815 the configuration states by overwriting the values of each setting of the base configuration state 735 with the values of each setting of the detachable device configuration state 730. For example, the synchronize module 515 may over write the values of the disable wireless setting 705, display brightness setting 710, audio setting 715, and touch sensitivity setting 720 of the base configuration setting 735 with values of the disable wireless setting 705, display brightness setting 710, audio setting 715, and touch sensitivity setting 720 of the detachable device configuration state 730.

The synchronize module 515 may synchronize 815 the configuration states by overwriting a value of a first setting of one configuration state with the value of a first setting of the other configuration state that is marked as preferred. A setting of a configuration state may be marked as preferred by writing a specified identifier to the preference 705c, 710c, 715c, 720c of the setting. For example, the audio setting 715 of the detachable device configuration state 730 may be marked as preferred by writing the specified identifier to the preference field 715c of the detachable device configuration state 730.

In response to synchronizing 815 the configuration states, the change module 505 may continue to monitor to detect 805 a change of configuration states. By synchronizing the configuration states 735, 730 of the base 105 and the detachable device 115, the method 800 provides seamless environment to user that maintains configuration states when the detachable device 115 is reconnected to the base 105.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a computer readable storage medium storing program code;
a processor executing the program code, the program code comprising:
a change module detecting a change of a configuration state for at least one of a base and a detachable device, the detachable device maintaining a device task list of one or more tasks currently executing on the base, the detachable device providing a display and a network connection for the base if the base and detachable device are connected, wherein the base only communicates with a network through the network connection of the detachable device and the base only employs the display of the detachable device as a display;
a connection module detecting a disconnection of the detachable device from the base and updating the device task list in response to detecting the disconnection, and detecting a connection between the base and the detachable device; and
a synchronize module continuing executing the one or more tasks of the device task list on the detachable device in response to detecting the disconnection and synchronizing the configuration state of the detachable device with the configuration state of the base in response to detecting the connection and detecting the change of configuration state, wherein a most recently modified value of a first configuration state overwrites a less recently modified value of a second configuration state.

2. The apparatus of claim 1, wherein a value of the detachable device configuration state overwrites a value of the base configuration state.

3. The apparatus of claim 1, wherein a preferred value of a first configuration state overwrites a value of a second configuration state.

4. The apparatus of claim 1, wherein the configuration states of the detachable device and the base comprise a disable wireless setting.

5. The apparatus of claim 1, wherein the configuration states of the detachable device and the base comprise a display brightness setting.

6. The apparatus of claim 1, wherein the configuration states of the detachable device and the base comprise an audio setting.

7. The apparatus of claim 1, wherein the configuration states of the detachable device and the base comprise a touch sensitivity setting.

8. The apparatus of claim 1, further comprising synchronizing the configuration states of the detachable device, the base, and a third device and wherein the one or more tasks comprise a Universal Resource Locator displayed in a browser by the display.

9. A method comprising:
- detecting, by use of a processor, a change of a configuration state for at least one of a base and a detachable device, the detachable device maintaining a device task list of one or more tasks currently executing on the base, the detachable device providing a display and a network connection for the base if the base and detachable device are connected, wherein the base only communicates with a network through the network connection of the detachable device and the base only employs the display of the detachable device as a display;
- detecting a disconnection of the detachable device from the base;
- updating the device task list in response to detecting the disconnection;
- continuing executing the one or more tasks of the device task list on the detachable device in response to detecting the disconnection;
- detecting a connection between the base and the detachable device; and
- synchronizing the configuration state of the detachable device with the configuration state of the base in response to detecting the connection and detecting the change of configuration state, wherein a most recently modified value of a first configuration state overwrites a less recently modified value of a second configuration state.

10. The method of claim 9, wherein a value of the detachable device configuration state overwrites a value of the base configuration state.

11. The method of claim 9, wherein a preferred value of the first configuration state overwrites a value of the second configuration state.

12. The method of claim 9, wherein the configuration states of the detachable device and the base comprise a disable wireless setting, a display brightness setting, an audio setting, and a touch sensitivity setting.

13. The method of claim 9, further comprising synchronizing the configuration states of the detachable device, the base, and a third device and wherein the tasks comprise a Universal Resource Locator displayed in a browser by the display.

14. A computer program product comprising a non-transitory computer readable storage medium storing computer readable program code executed by a processor to perform operations for state sharing, the operations of the computer program product comprising:
- detecting a change of a configuration state for at least one of a base and a detachable device, the detachable device maintaining a device task list of one or more tasks currently executing on the base, the detachable device providing a display and a network connection for the base if the base and detachable device are connected, wherein the base only communicates with a network through the network connection of the detachable device and the base only employs the display of the detachable device as a display;
- detecting a disconnection of the detachable device from the base;
- updating the device task list in response to detecting the disconnection;
- continuing executing the one or more tasks of the device task list on the detachable device in response to detecting the disconnection;
- detecting a connection between the base and the detachable device; and
- synchronizing the configuration state of the detachable device with the configuration state of the base in response to detecting the connection and detecting the change of configuration state, wherein a most recently modified value of a first configuration state overwrites a less recently modified value of a second configuration state.

15. The computer program product of claim 14, wherein a value of the detachable device configuration state overwrites a value of the base configuration state.

16. The computer program product of claim 14, wherein the configuration states of the detachable device and the base comprise a disable wireless setting, a display brightness setting, an audio setting, and a touch sensitivity setting.

17. The computer program product of claim 14, further comprising synchronizing the configuration states of the detachable device, the base, and a third device and wherein the tasks comprise a Universal Resource Locator displayed in a browser by the display.

* * * * *